(12) United States Patent
Horovitz et al.

(10) Patent No.: US 8,017,851 B2
(45) Date of Patent: Sep. 13, 2011

(54) SYSTEM AND METHOD FOR PHYSICALLY INTERACTIVE MUSIC GAMES

(75) Inventors: Ronen Horovitz, Haifa (IL); Ran Kaftory, Kiryat Tivon (IL)

(73) Assignee: Eyecue Vision Technologies Ltd., Yokneam (IL)

( * ) Notice: Subject to any disclaimer, the term of this patent is extended or adjusted under 35 U.S.C. 154(b) by 0 days.

(21) Appl. No.: 12/663,778

(22) PCT Filed: Jun. 12, 2008

(86) PCT No.: PCT/IL2008/000808
§ 371 (c)(1),
(2), (4) Date: Dec. 9, 2009

(87) PCT Pub. No.: WO2008/152644
PCT Pub. Date: Dec. 18, 2008

(65) Prior Publication Data
US 2010/0173709 A1 Jul. 8, 2010

Related U.S. Application Data

(60) Provisional application No. 60/929,073, filed on Jun. 12, 2007.

(51) Int. Cl.
*G10H 1/40* (2006.01)
*G10H 7/00* (2006.01)

(52) U.S. Cl. .......... 84/611; 84/464 R; 84/464 A
(58) Field of Classification Search ............. 84/464 R, 84/464 A, 611
See application file for complete search history.

(56) References Cited

U.S. PATENT DOCUMENTS

| | | | | |
|---|---|---|---|---|
| 5,513,129 | A  * | 4/1996  | Bolas et al. | 703/13 |
| 6,245,982 | B1 * | 6/2001  | Suzuki et al. | 84/477 R |
| 6,646,644 | B1 * | 11/2003 | Suzuki et al. | 345/474 |
| 7,042,440 | B2   | 5/2006  | Pryor et al. | |
| 7,446,253 | B2 * | 11/2008 | Knapp et al. | 84/722 |
| 7,754,955 | B2 * | 7/2010  | Egan | 84/600 |
| 2006/0259862 | A1 | 11/2006 | Adams et al. | |
| 2007/0000374 | A1 * | 1/2007 | Clark et al. | 84/724 |
| 2008/0060499 | A1 * | 3/2008 | Sitrick | 84/477 R |

OTHER PUBLICATIONS

International Search Report of Application No. PCT/IL2008/000808 mailed on Oct. 23, 2008.

* cited by examiner

*Primary Examiner* — Jeffrey Donels
(74) *Attorney, Agent, or Firm* — Pearl Cohen Zedek Latzer, LLP

(57) ABSTRACT

A system and method of capturing an image of an object, where the object is associated with a musical feature, generating the musical feature once the object is detected in the image, detecting a change of a position of an the object in a series of images, and altering the musical feature in response to such change.

15 Claims, 3 Drawing Sheets

SYSTEM AND METHOD FOR PHYSICALLY INTERACTIVE MUSIC GAMES

CROSS-REFERENCE TO RELATED APPLICATIONS

This application is a National Phase Application of PCT International Application No. PCT/IL2008/000808, International Filing Date Jun. 12, 2008, entitled "System and Method for Physically Interactive Music Games" published on Dec. 18, 2008 as WO 2008/152644 claiming priority of U.S. Provisional Patent Application No. 60/929,073, filed Jun. 12, 2007, both of which are incorporated herein by reference in their entirety.

FIELD OF THE INVENTION

The invention pertains generally to interactive educational, physical and entertaining activities. More specifically, this application relates to music games and image processing, and particularly, to maintaining the play features of a band playing with musical instruments through interaction between the players, objects representing the musical instruments and an imaging device.

BACKGROUND AND DESCRIPTION OF PRIOR ART

U.S. Pat. No. 7,042,440, which issued to Pryor, et al., on May 9, 2006, discloses methods and apparatus for inputting position, attitude (orientation) or other object characteristic data to computers for the purpose of Computer Aided Design, Painting, Medicine, Teaching, Gaming, Toys, Simulations, Aids to the disabled, and internet or other experiences.

U.S. Pat. No. 7,053,915, which issued to Jung, et al., on May 30, 2006, discloses a system and method for increasing the value of the audio-visual entertainment systems, such as karaoke, by simulating a virtual stage environment and enhancing the user's facial image in a continuous video input, automatically, dynamically and in real-time.

SUMMARY OF THE INVENTION

Embodiments of the invention may include a system for interactive music, where such system includes a visible object with predefined association to a musical effect, where the association may be recorded in a memory that is connected to a processor, an imager to capture a series of images of the object, a sound generator such as a loud speaker to generate a musical effect such as the musical effect that is associated with the object, and a processor to detect the presence of the object in the image or series of images, and to alter a feature of the music in accordance with the pre-defined response to the detected object.

In some embodiments, the system may include a display upon which may be shown a scene that may be altered to correspond with detected object in the image.

In some embodiments, the object is associated with a musical instrument and the processor alters the feature of the sound to correspond to the musical instrument that appears in the image.

In some embodiments the processor detects a movement of the object in a series of images and alters a feature of the music in accordance with the detected movement.

In some embodiments a processor is to alter a musical note in accordance with the movement that is detected.

In some embodiments the processor may alter a rhythm of the generated music in response to the movement of the object.

In some embodiments, the object may be or include an article of clothing.

In some embodiments the invention may include a method of associating an object in an image with a pre-defined musical feature, generating the musical feature upon a detection of the object in the image, detecting a change of a position of the object in a series of images, and altering the musical feature in response to the change in such position.

In some embodiments, a method may include displaying a representation of the change in the position of the object on a display, where such change corresponds to the altering of the musical feature.

In some embodiments a method may include associating the object with a scale of a musical instrument and displaying the musical instrument on said display.

In some embodiments a method may include altering a volume of a sound in response to a change of position of the object in the image relative to an imager.

In some embodiments, a method may include detecting a height of the object in the image, and altering a pitch or other musical feature in response to the detected change in height.

In some embodiments, a method may include detecting a velocity of change of position of the object, and the altering of musical feature may include altering a tempo.

Embodiments of the invention may include a system having a wearable object that has pre-defined associations with one or more musical effect, an imager to capture a series of images of the object; a sound generator to generate the musical effect, and a processor to detect a pre-defined change in an image of the wearable object, and to alter the musical effect in accordance with the pre-defined change.

In some embodiments, the wearable object includes an article of clothing, and the pre-defined change includes pointing or signaling to a pre-defined area of the clothing, to generating a musical tone associated with the pre-defined area.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention.

However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored on an article such as a memory device, where such instructions upon execution result in a method of an embodiment of the invention.

Figure 1:
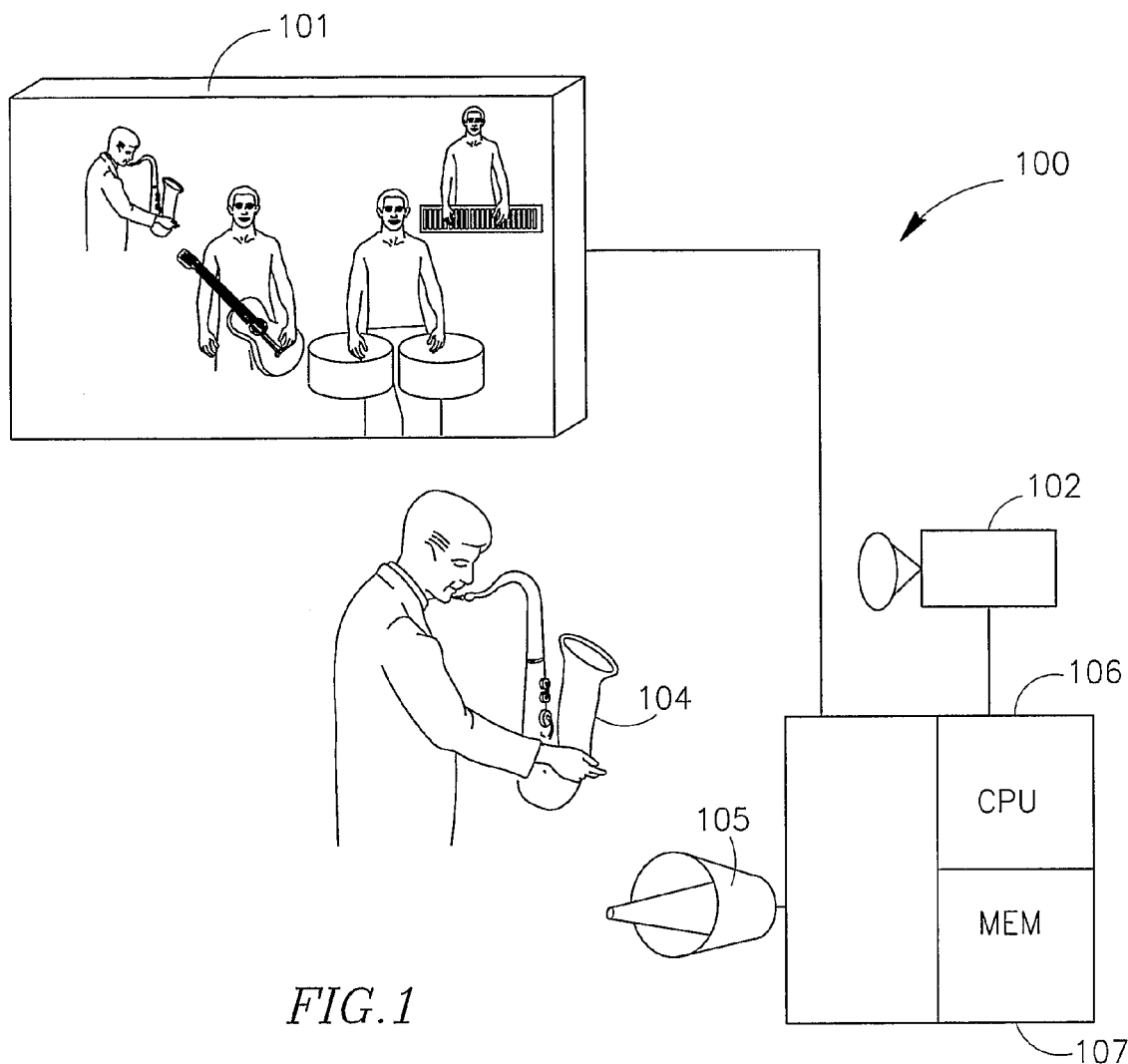
FIG. 1 is a schematic diagram of components of a system in accordance with an embodiment of the invention.

Reference is made to FIG. 1, a schematic diagram of a system including an imaging device, a processor, a display, a speaker and an object to be identified and tracked in accordance with an embodiment of the invention. In some embodiments, a system 100 may include for example a screen or display 101 that may be connected or associated with a processor 106, an imager 102 that may capture an image of an object 104, and relay or transmit digital information about the image to processor 106, and a speaker 105 or other sound transmission device that may be connected to processor 106. Characteristics of objects 104 may be recognizable in an image captured by imager 102, and may be predefined in a memory 107 that may be associated with processor 106 as representing for example a musical instrument or other object.

In operation, imager 102 may capture images of objects 104 that may be brought into a field of view of imager 102 by for example players or participants. Parameters associated with object 104 as are captured in an image may be analyzed by processor 106 and may be interpreted in accordance with pre-defined rules to vary a characteristic of music or notes that may be produced by sound generator or speaker 105. For example, a processor 106 may track a rate of side-to-side movement of a colored or other object 104 that may appear in a series of images that may be captured by imager 102. Processor 106 may compare such rate of movement with a speed of a beat or rhythm of music being produced by speaker 105, and may increase a speed of such rhythm to correspond to an increase in a speed of such movement of object 104 in a series of images. In some embodiments, a pitch, tone, note, tempo, beat or other musical parameters may be varied to correspond to a movement or change in a movement of one or more objects 104 captured in one or more images, so that various music parameters or features may be controlled by the movement of the players or objects 104 in the image to achieve a physically interactive experience for the players.

The musical characteristics or features may be based on the position and motion features exhibited by the players in respect of the instruments or objects 104. In some embodiments, tasks involved in playing a music game may track or simulate musicians in a music band that may appear in a scene on display 101. In some embodiments, there may be created an interactive music experience where the user may influence or alter a feature of the music by way of his movements as are captured in the image.

In some embodiments, an object 104 such as a foam or plastic saxophone may be associated with a scale or sound that is made by a saxophone. Other materials may be used. When the object 104 is detected in an image, the music that may be generated by speaker 105 may assume a scale or sound effect of a saxophone. If object 104 is replaced in such image with another object that may be pre-defined as being associated with a flute, speaker 105 may change the scale of the music to the scale associated with a flute, and an image of a flute may be shown in place of a saxophone. Processor 106 may continue to track object 104 in a series of images and may alter one or more features of the music to correspond to the movements of object 104 in such series of images.

In some embodiments, object 104 may be or include a physical object 104 that may be colored or shaped in a particular or pre-defined fashion, and that may represent or simulate an appearance or shape of a musical instrument. Object 104 may be fashioned or for example, cardboard, foam, plastic or other suitable material. Object 104 may include one or more colors or patters of colors, textures, shapes or other features that may be recognizable in an image captured by imager 102. For example, a violin can be colored in yellow with black edges and a black circle in its middle. A flute can be blue with green tips. Other colors, shapes and patterns may be used.

The captured images may be color segmented, using the mean-shift segmentation, for example, on the RGB, Lab, HSV or any other color space representation. The color of each segment may be classified against a set of pre-defined colors representing the set of pre-defined objects 104. The instruments or objects 104 may be detected by matching several features of the color segments against a set of pre-defined representations of the instruments. These features may include proximity of colored segments, blob analysis such as area, orientation, solidity, major axis and minor axis. Morphological operators such as dilation, erosion, opening and closing may also be used to compensate for unwanted artifacts in the color segments of objects 104 such as for example holes inside segments caused for example by the player's hands that may occlude objects 104. This may compensate for the values of the features that may be affected by noisy artifacts.

Figure 2:
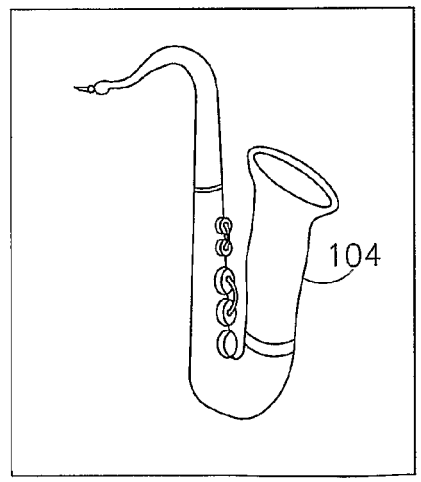
FIG. 2 is a simplified representation of a captured image in an embodiment of the invention.

Reference is made to FIG. 2, a simplified representation of a captured image in an embodiment of the invention. In some embodiments, several features of the detected instruments may be extracted such as positions of objects 104 in an XY plane as well as their velocity and acceleration may be tracked and calculated from changes in their positions over a series of frames. Morphological features of objects 104 may be extracted such as their center of mass, bounding box, area and orientation, as well as their angular velocity and angular acceleration may be tracked and calculated from changes in their orientation. Optical flow methods may also be employed for motion estimation. Other features may be used. Distance of an object from imager 102 may be inferred by several ways: testing a size of the object in the image, calculating a bounding box area, using one of their major or minor axis as representing their size or using both to more accurately calculate their enclosed area as to take into consideration the orientation of the object 104 in the image. The definition of the major/minor axis is the length (in pixels) of the major/minor axis of the ellipse that has the same second-moments as the region. A location of object 104 in an XY plane may be inferred by calculating a center of mass of the segments.

Features of the detected object 104 may be tracked in space and time. A tracked state vector which may consist of all features being tracked, for example, position, velocity, etc may be formed. A state transition model may be developed for each feature, for example, that next object 104 position may be calculated using the current position plus the current velocity multiplied by the time difference. Since the measurements of the features may be corrupted by noise introduced by the acquisition system and the segmentation process, a tracking filter such as the Kalman Filter or Particle filtering may be used to estimate the next state vector given the current one. This estimation may be used to reject false identifications and compensate for inaccuracies in features values.

In some embodiments, a correspondence between musical features and instrument object features may be created. For example, music emitted from speaker 105 may be notes or other features generated from various signals or movements of object 104 that are captured in the images. For example, the distance of an object 104 from the camera may control a volume of that musical instrument in the played music such that when the player moves away from the imager 102 with the instrument, the volume level decreases. The height of the object from the ground may dictate a pitch of the sound generated by the instrument represented by the object 104, such that if the participant lowers the object 104, its represented sound may be emitted at a lower pitch and vice versa. A velocity of the motion of the object 104 or a participant holding object 104 as may be captured in a series of videos may control the tempo, rhythm or timbre for the corresponding instrument. Any of such or other movements may also control an individual note or chord that may be emitted by speaker 105. Other motions or movements may also be used.

In some embodiments, music may be composed through the movements of the instruments in a pre-recorded composition or freestyle mode. When pre-recorded compositions are played by speaker 105, variations may be executed in real time based on motions of the instruments or object 104. A change in speed of one pre-designated lead instrument may change the speed of all instruments. In some embodiments, a participant may point to one or more objects 104 as may represent instruments in the way that a conductor would point to a section of an orchestra, and such instruments may become louder or softer, faster or slower. When freestyle mode is used, the various movements and corresponding features create a new composition.

Variations in musical features may be created for example on a MIDI or other sound generator, that may be programmed to compose notes for the detected and tracked instruments in accordance with the calculated velocity, position and distance as described above. In some embodiments, notes or chords may be generated on a frame by frame basis, and players may control the music generated or alter an existing tune or feature.

In some embodiments, participants may appear in view of imager 102. Display 101 may show for example a scene of a band in for example a 2D or 3D graphic simulation, with avatars placed at different locations on the scene to represent the state or position of the participants in view of imager 102. The avatars may for example appear to hold musical instruments corresponding to the musical instruments represented by the objects 104 in the captured image or other instruments.

If a participant picks up or shows a different object 104, a new avatar may appear on the screen with a new instrument. If an object 104 leaves the field of view of the imager 102, the represented instrument may disappear from the screen or the avatar holding it may stop playing. In some embodiments the player or group of players may form a music band, playing various instruments (i.e. saxophone, violin, guitar, flute, etc.), and a scene on display 101 may be altered in response to the movement of the participants.

The avatars on the screen may be animated as playing these instruments in a way that will resemble the movements of the participants in the real world to create a karaoke-like experience where the audience views the avatars rather than the participants. In some embodiments graphics may be added to the avatars to make the visual experience displayed on a screen correspond to the music or rhythm created by the participants.

Figure 3:
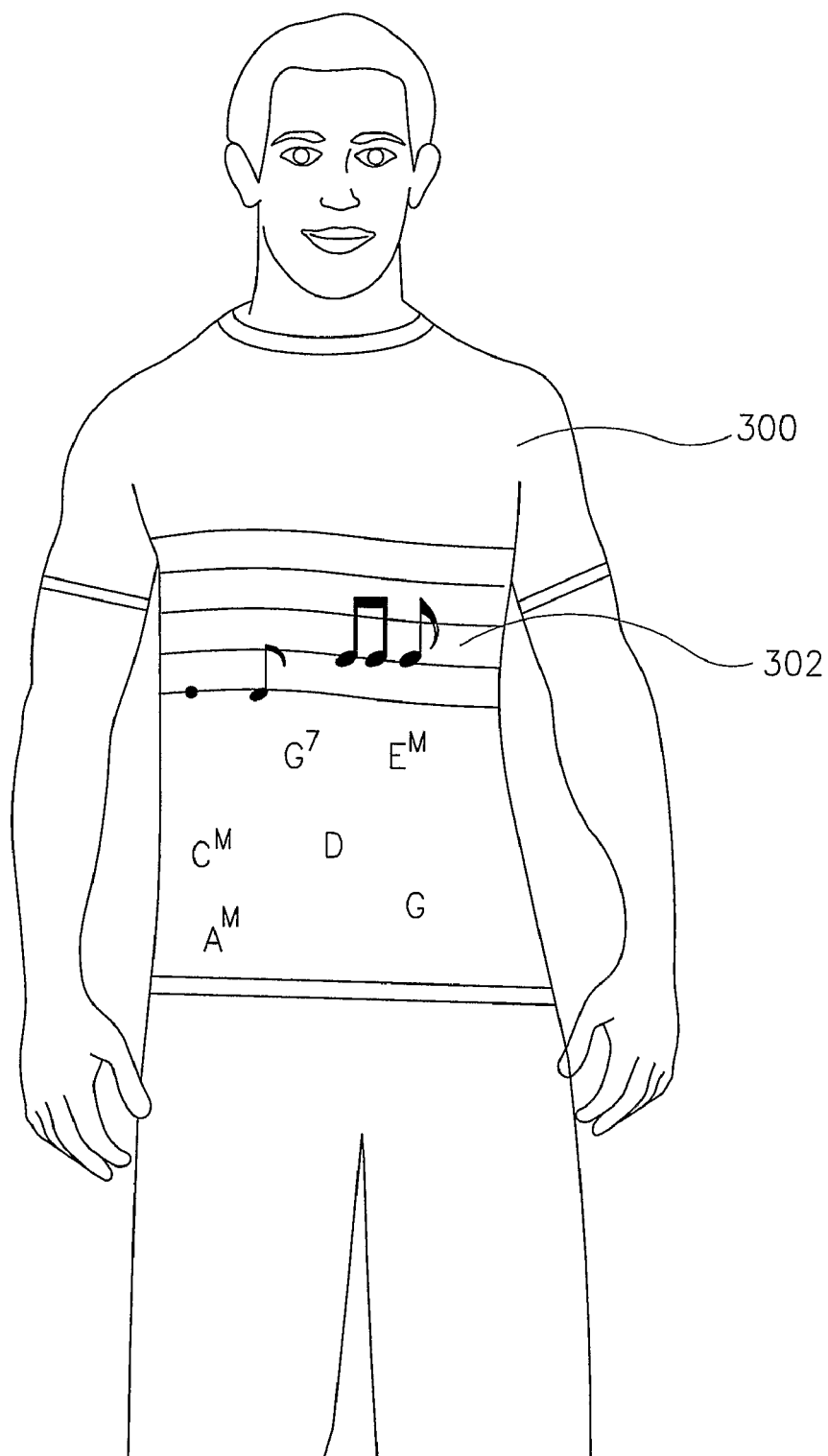
FIG. 3 is a diagram of an article of clothing having representations of instruments or musical features printed or otherwise identifiable thereon in accordance with an embodiment of the invention.

Reference is made to FIG. 3, a diagram of an article of clothing having representations of instruments or musical features printed thereon in accordance with an embodiment of the invention. In some embodiments a participant may wear or hold an article of clothing such as a shirt 300 that may have printed or attached different colors or patterns 302 that may represent notes, instruments, chords or other musical features. A participant may point to, cover over, highlight or otherwise indicate one or more of the representations in a view of an imager. A processor may interpret the image and generate a musical feature that matches the representation indicated on the clothing. In some embodiments, a user may compose music by pointing to, covering or otherwise indicating in the image the note or chord to be generated.

In another embodiment, a participant may wear, hold or point to a suit, fabric, or poster of colors, where a musical feature may be generated by raising, lowering or otherwise moving one area of the suit or poster in front of an imager.

In another embodiment motion tracking techniques may be used for a karaoke-like game play where the movements of an object or movements of the body and head of the subject give different effects to the voice of the singer, such as echo, delay or other.

Figure 4:
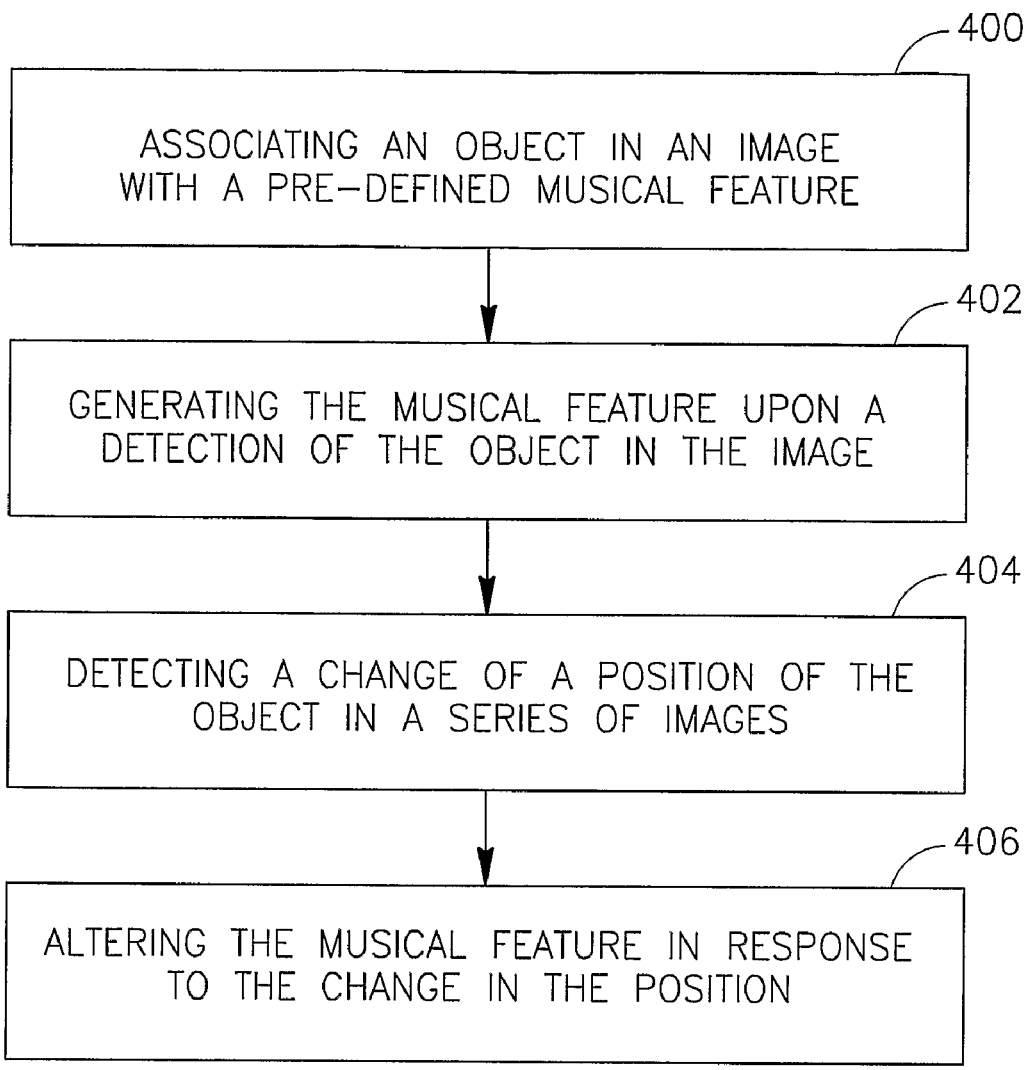
FIG. 4 is a flow diagram of a method in accordance with an embodiment of the invention.

Reference is made to FIG. 4, a flow diagram of a method in accordance with an embodiment of the invention. In block 400, a memory may store a musical effect such as a sound or characteristic of an instrument with shape, pattern or representation of an instrument as may appear in an image and as may be detected by a processor in such image. In some embodiments, the representation of the instrument or effect as may appear in the image may include a pre-defined color, pattern or other marking that may be readily identifiable in an image. In some embodiments, a processor may segment one or more images and extract the object being searched for from the segment.

In block 402, a processor may issue a signal to a speaker or other sound generator to generate a sound, effect or musical feature that may be associated with or correspond to the instrument or other representation as was detected in the image.

In block 404, a processor may detect a movement of the object in or between two or more of the images that may have been captured that include the object. In some embodiments, the object that is detected in a first image may be tracked over a series of images and the processor may detect a velocity or rhythm in the movements of the object over time in the series of images.

In block 406, a processor may signal a speaker or sound generator to alter a sound, rhythm musical feature or effect to correspond with a movement of the object in the series of images.

In some embodiments, a method may include changing an avatar or representation in a displayed scene to correspond to the movement of an instrument held by a player, such that the movement of the avatar corresponds to a change in the musical feature as was collected from the object in the series of images. For example, a change in a beat or rhythm in an image or series of images may change the avatars from for example a waltzing-couple that may be shown when the rhythm of the music was flowing, to a rapping youth that may be shown for a faster beat.

It will be appreciated by persons skilled in the art that embodiments of the invention are not limited by what has been particularly shown and described hereinabove. Rather the scope of at least one embodiment of the invention is defined by the claims below.

We claim:

1. A system for interactive music comprising:
an object having color patterns recognizable by a processor in an image captured by an imager, said object having a predefined association with a musical feature;
an imager to capture a series of images of said object;
a sound generator to generate said musical feature; and
a processor to:
detect said object in said series of images;
recognize said object in said series of images according to said color patterns; and
alter said feature of said music in accordance with a pre-defined response to said detected object.

2. The system as in claim 1, comprising a display, and wherein said processor is to alter a scene shown on said display to correspond with said detected object in said image.

3. The system as in claim 1, wherein said object is associated with a musical instrument, and wherein said processor is to alter said feature of said sound corresponding to said musical instrument.

4. The system as in claim 1, wherein said processor is to detect a movement of said object in said series of images and wherein said processor is to alter a feature of said music in accordance with said movement.

5. The system as in claim 1, wherein said processor is to alter a musical note in accordance with said movement.

6. The system as in claim 1, wherein said processor is to alter a rhythm in response to the movement of said object detected in the image.

7. The system as in claim 1, wherein said object is an article of clothing.

8. A method comprising:
recognize an object in an image according to color patterns;
associating said object in said image with a pre-defined musical feature;
generating said musical feature upon a detection of said object in said image;
detecting a change of a position of said object in a series of said images; and
altering said musical feature in response to said change in said position.

9. The method as in claim 8, comprising displaying a representation of said change in said position of said musical feature on a display.

10. The method as in claim 8, wherein said associating comprises associating said object with a scale of a musical instrument, and wherein said displaying comprises displaying said musical instrument on said display.

11. The method as in claim 8, wherein altering said musical feature comprises altering a volume of said music in response to said change of position of said object in said series of images relative to an imager of said images.

12. The method as in claim 8, wherein said detecting said change comprises detecting a height of said object in said image, and wherein said altering comprises altering a pitch in response to said change in height.

13. The method as in claim 8, wherein said detecting comprises detecting a velocity of said change of position, and wherein said altering said musical feature comprises altering a tempo.

14. A system comprising:
a wearable object having color patterns recognizable by a processor in an image captured by an imager, said wearable object having a predefined association with a musical effect;
an imager to capture a series of images of said object;
a sound generator to generate said musical effect; and
a processor to:
detect a pre-defined change in an image of said wearable object;
recognize said wearable object in said series of images according to said color patterns; and
alter said musical effect in accordance with said pre-defined change.

15. The system as in claim 14, wherein said wearable object comprises an article of clothing, and wherein said pre-defined change comprises signaling a pre-defined area of said clothing, and wherein altering said musical effect comprises generating a musical tone associated with said pre-defined area.

* * * * *